(12) United States Patent
Pedersen et al.

(10) Patent No.: US 7,506,205 B2
(45) Date of Patent: Mar. 17, 2009

(54) DEBUGGING SYSTEM AND METHOD FOR USE WITH SOFTWARE BREAKPOINT

(75) Inventors: Frode Milch Pedersen, Trondheim (NO); Andreas Engh-Halstvedt, Trondheim (NO); Erik Knutsen Renno, Trondheim (NO); Are Arseth, Trondheim (NO)

(73) Assignee: ATMEL Corporation, San Jose, CA (US)

( * ) Notice: Subject to any disclaimer, the term of this patent is extended or adjusted under 35 U.S.C. 154(b) by 431 days.

(21) Appl. No.: 11/354,340

(22) Filed: Feb. 14, 2006

(65) Prior Publication Data

US 2007/0220334 A1    Sep. 20, 2007

(51) Int. Cl.
*G06F 11/00* (2006.01)
(52) U.S. Cl. .......................... 714/30; 714/35
(58) Field of Classification Search ............ 714/30, 714/35
See application file for complete search history.

(56) References Cited

U.S. PATENT DOCUMENTS

| | | | |
|---|---|---|---|
| 5,848,026 A | | 12/1998 | Ramamurthy et al. |
| 6,145,123 A | * | 11/2000 | Torrey et al. ................. 717/128 |
| 6,272,451 B1 | | 8/2001 | Mason et al. |
| 6,321,329 B1 | * | 11/2001 | Jaggar et al. ................. 712/227 |
| 6,367,032 B1 | * | 4/2002 | Kasahara ..................... 714/25 |
| 6,516,428 B2 | | 2/2003 | Wenzel et al. |
| 6,591,378 B1 | * | 7/2003 | Arends et al. ................ 714/38 |
| 6,687,857 B1 | * | 2/2004 | Iwata et al. ................... 714/38 |
| 6,732,311 B1 | | 5/2004 | Fischer et al. |
| 6,798,713 B1 | | 9/2004 | Yearsley et al. |
| 6,857,084 B1 | * | 2/2005 | Giles .......................... 714/35 |
| 2003/0037225 A1 | | 2/2003 | Deng et al. |
| 2003/0225567 A1 | | 12/2003 | Koch et al. |
| 2004/0049712 A1 | * | 3/2004 | Betker et al. ................. 714/35 |
| 2005/0216792 A1 | | 9/2005 | Tsuboi et al. |
| 2008/0072103 A1 | * | 3/2008 | Wenkwei ..................... 714/38 |

OTHER PUBLICATIONS

"J-Link ARM RDI Flash Breakpoints" [online]. Segger 2001-2005, [retrieved on Jan. 30, 2006]. Retrieved from the Internet: <URL: http://www/segger.com/jlink_arm_rdi_flashbp.html>, 7 pages.

(Continued)

*Primary Examiner*—Marc Duncan
(74) *Attorney, Agent, or Firm*—Fish & Richardson P.C.

(57) ABSTRACT

Methods and systems are provided for debugging a program executing on a processor. In a first implementation, a processing system includes a processor configured for switching to a debug mode from a non-debug mode upon executing a software breakpoint. The system may include a program memory configured to hold instructions for a program, where the software breakpoint replaces at least one of the instructions. The system may also include an instruction replacement register separate from the program memory that is configured to receive the replaced instruction from any of the processor and an external debugger. The system may further include a control component that controls whether the processor fetches a next instruction for execution from the program memory or from the instruction replacement register.

21 Claims, 2 Drawing Sheets

OTHER PUBLICATIONS

'AVR067: JTAGICE mkll Communication Protocol' [online]. Atmel, 2006, [retrieved on Dec. 11, 2007]. Retrieved from the Internet: <URL: http://www.atmel.com/dyn/resources/prod_documents/doc2587.pdf>, 82 pages.

'Designing for Efficient Production with In-System Re-programmable Flash μCs' [online]. Atmel, 2006 [retrieved on Dec. 11, 2007]. Retrieved from the Internet: <URL: http://www.atmel.com/dyn/resources/prod_documents/issue4_pg16_17_DesignC.pdf>, 2 pages.

'Connecting to a target board with the AVR JTAGICE mkll' [online]. Atmel, 2006, [retrieved on Dec. 11, 2007]. Retrieved from the Internet: <URL: http://www/atmel.com/dyn/ resources/prod_documents/doc2562.pdf>, 5 pages.

'AVR JTAGICE mkll: On-chip Debug System' [online]. Atmel, 2004, [retrieved on Dec. 11, 2007]. Retrieved from the Internet: <URL: http://atmel.com/dyn/resources/prod_documents/doc2489.pdf>, 2 pages.

Atmel, "AVR JTAG ICE: On-chip Debug System," Atmel Corporation, 2001, 2 pages.

* cited by examiner

DEBUGGING SYSTEM AND METHOD FOR USE WITH SOFTWARE BREAKPOINT

TECHNICAL FIELD

The description relates to hardware-assisted debugging of software systems.

BACKGROUND

A fundamental property of debugging a conventional processor (e.g., microprocessor)-based system is the ability to halt execution at a specific instruction in the program code. The point at which execution is halted is commonly referred to as the breakpointed instruction. Breakpoints allow an associated debugger to examine the state of the system at the designated time, allowing, for example, software errors to be quickly identified and removed.

The debugger can be an external debugger connected to a debug port (in some conventional systems the port is can be implemented as a JTAG port, a particularly configured serial interface specified by the IEEE Joint Test Action Group), or the debugger can be a monitor program running on the processor's central processing unit (CPU). Such a monitoring program is commonly referred to as a self-hosted debugger. External debug tools are well suited for basic low-level, application-independent debugging. Self-hosted debuggers consume some system resources (e.g., program memory, communication peripherals, registers etc.), but are useful for higher-level debugging of complex applications, e.g. operating systems (OS), as they can provide OS-specific task and status information. Furthermore, self-hosted debuggers allow peripherals and interrupts to be serviced during the debug session, minimizing the impact to the underlying application. Both external and self-hosted debuggers can rely on the same debug features (e.g., breakpoints) in the CPU to enable the user to debug the program.

One conventional way to implement a breakpoint is to allocate a specific instruction opcode as a breakpoint instruction. When the CPU of the processor executes this software breakpoint, the CPU can enter debug mode, and return control to the debugger.

To insert a software breakpoint, conventionally the debugger may be required to store the opcode of the breakpointed instruction in some kind of internal, temporary storage. The program memory contents can then be changed, overwriting the opcode of the breakpointed instruction with the software breakpoint instruction. When the CPU executes the software breakpoint, the debugger can examine the system state, and optionally perform other debugging tasks. When finished with the debug tasks, the debugger must execute the breakpointed instruction and return to the instruction following the breakpoint. In some conventional systems, the breakpointed instruction is written to a debug instruction register, and executed on the CPU after it has returned from debug mode.

Software breakpoints are popular, as they are relatively inexpensive to implement, and a large number of breakpoints can be inserted. However, software breakpoints do have a few drawbacks, which limit their usefulness. Some instructions may depend on the mode in which they are executed, e.g. they may execute differently in debug mode than in normal mode. Other instructions, such as a branch instruction, may depend on the current program counter (PC) location as well. In certain implementations, the breakpointed instruction cannot be executed when the CPU is in debug mode, as described above. Instead, the debugger removes the software breakpoint by rewriting the original opcode back to its location in the program memory and exits debug mode, restarting the instruction. The original instruction is thus executed correctly, but the software breakpoint is lost, which is normally not desired. To prevent this, the debugger may be required to insert another software breakpoint on the following instruction before exiting debug mode. When returning from debug mode, the breakpointed instruction will be executed correctly, and the CPU will immediately return to debug mode on the following software breakpoint. The debugger can then overwrite the breakpointed instruction with the software breakpoint, remove the second breakpoint, and exit debug mode.

The multi-breakpoint process described above is sometimes used in connection with microcontrollers having volatile program memory (e.g. RAM). However, if non-volatile program memory such as Flash memory is used, the process becomes further complicated, since a large part of the memory may be required to be erased and rewritten to replace the breakpoint with the original opcode. The whole scale erase and re-write operations are a time-consuming procedure, and may only be applied a limited number of times before the Flash memory wears out. Software breakpoints in these types of systems and processes are less suitable for interactive debugging (e.g., on microcontroller devices with embedded Flash program memory).

For this reason, a number of hardware breakpoint modules are frequently found in such conventional systems. The hardware breakpoint modules do not alter the program memory, but instead halt the CPU when instructions at a particular address in the code are executed. In some conventional systems, each module can normally only halt at a single address. The hardware breakpoint modules may be very costly in terms of silicon area and normally only a relatively small number of hardware breakpoint modules may be included in a singular system. Therefore, hardware breakpoints are most useful to supplement software breakpoints, to reduce the number of times the Flash memory needs to be reprogrammed. In cases where the user needs more breakpoints than there are hardware breakpoint modules available, the debugger must again rely on software breakpoints, despite their inherent drawbacks.

SUMMARY

In a first implementation, a processing system includes a processor configured for switching to a debug mode from a non-debug mode of operation upon executing a software breakpoint. The system may include a program memory configured to hold instructions for a program, where the software breakpoint replaces at least one of the instructions. The system may also include an instruction replacement register separate from the program memory that is configured to receive the replaced instruction from any of the processor and an external debugger. The system may further include a control component that controls whether the processor fetches a next instruction for execution from the program memory or from the instruction replacement register.

Implementations may include any or all of the following features. A self-hosted debugger may be used in the debug mode, the self-hosted debugger being operated by the processor executing self-hosted debug instructions. The control component may provide that the processor fetches the next instruction from the program memory at least in the debug mode. The self-hosted debugger may cause the processor to place the replaced instruction in the instruction replacement register before the self-hosted debugger instructs the processor to return from the debug mode to the non-debug mode. When the external debugger is used in the debug mode, the external debugger may place at least one debug instruction in the instruction replacement register. The control component may provide that the processor fetches the debug instruction from the program memory. The external debugger may place an instruction in the instruction replacement register for the processor to return from the debug mode to the non-debug mode, and may thereafter place the replaced instruction in the instruction replacement register. The control component may provide that the processor fetches the replaced instruction from the instruction replacement register. The control component may provide that the processor thereafter fetches at least one remaining instruction of the program from the program memory. The control component may use a monitor mode bit that indicates whether a self-hosted debugger or the external debugger is to be used in the debug mode. The system may further include a debug program counter register configured to hold at least one program counter value to be used in executing the replaced instruction. The debug program counter register may be configured to receive the program counter value from either of the processor or the external debugger.

In another implementation, a method to be performed in connection with debugging includes switching a processor to a debug mode from a non-debug mode upon the processor executing a software breakpoint that replaces an instruction of a program in a program memory. The method may include fetching a debug instruction from the program memory for execution in the debug mode. The method may also include switching the processor to the non-debug mode upon receiving a return instruction. The method may further include fetching the replaced instruction, upon reinitiating execution of the program in the non-debug mode, from an instruction replacement register separate from the program memory.

Implementations may include any or all of the following features. The debug instruction may be fetched from the program memory upon determining a status of a monitor mode bit. The replaced instruction may be fetched upon determining a status of an instruction replacement bit. The method may further include fetching a program counter value from a debug program counter register for use in executing the replaced instruction. The method may further include executing the replaced instruction in the non-debug mode. The method may further include thereafter fetching at least one remaining instruction of the program from the program memory.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION OF EXEMPLARY EMBODIMENTS

Figure 1:
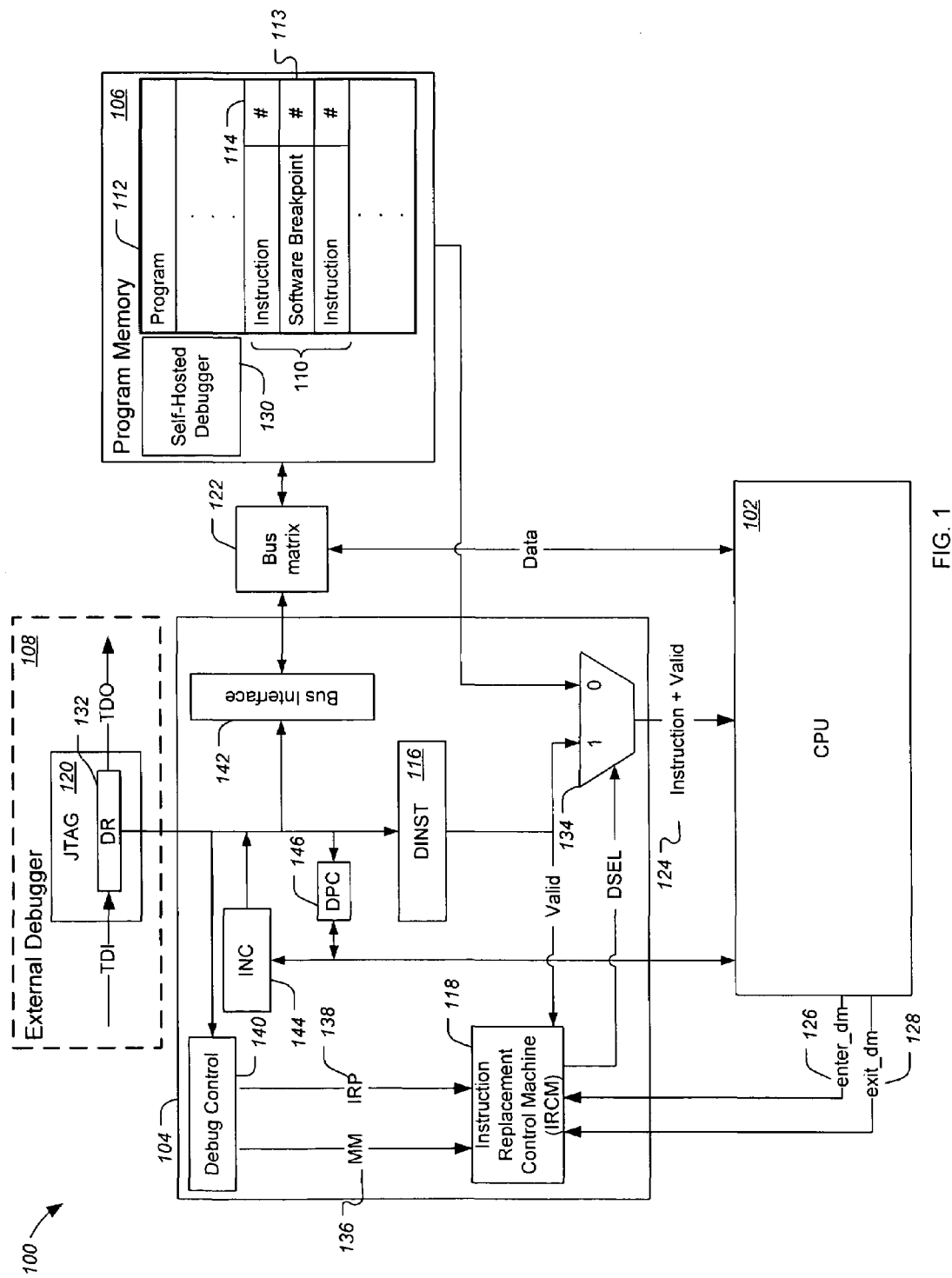
FIG. 1 shows an exemplary processing system in which an external debugger or a self-hosted debugger, or both, can be used.

FIG. 1 shows an exemplary processing system 100 including a central processing unit (CPU) 102 and in which an external debugger 108 or a self-hosted debugger 130, or both, can be used. The CPU 102 is configured to operate in a debug mode and in at least one non-debug mode, such as a normal mode of operation. The processing system 100 includes a program memory 106 that is configured to hold instructions 110 of a program 112. A software breakpoint 113 has been inserted to replace at least one of the instructions in the program 112. The system 100 further includes a debug instruction (DINST) register 116 separate from the program memory 106 for holding the replaced instruction. The DINST register 116 can receive the replaced instruction from either of the CPU 102 or the external debugger 108. The system 100 further includes an instruction replacement control machine (IRCM) 118 that controls whether the CPU 102 fetches a next instruction for execution from the program memory 106 or from the DINST register 116. Particularly, upon the CPU 102 leaving the debug mode, the replaced instruction will be fetched from the DINST register 116 and be executed in normal mode. This applies both when the system 100 uses the external debugger 108 or the self-hosted debugger 130, In one implementation, the processing system 100 includes an on-chip debug (OCD) system 104 to which the external debugger 108 connects using, for example, a Joint Test Action Group (JTAG) interface 120. The JTAG interface 120 can be of the form of a serial debug interface that complies with the IEEE 1149.1 standard for test access ports. In other implementations, another interface may be used. The JTAG interface 120 includes data register (DR) 132 that, in some implementations, can receive test data input (TDI) from the external debugger 108 and send test data output (TDO) to the external debugger 108. For example, the external debugger 108 can send, using an operation available in the JTAG interface 120, debug instructions to the OCD system 104 using the DR 132 in the JTAG interface 120 to the DINST register 116. The purpose of the debug instruction may be to allow the debugger to inspect or change the state of the CPU. A debug instruction may be applied to the CPU both from the external debugger or from a self-hosted debugger.

The OCD system 104 is also connected to the program memory 106 via a system bus 122. The OCD system 104 can transmit an instruction and a valid signal 124 to the CPU 102, and receive an enter debug mode (enter_dm) signal 126 and an exit debug mode (exit_dm) signal 128 from the CPU 102.

In this example, the OCD system 104 includes a multiplexer (MUX) 134 that the IRCM 118 controls to allow the CPU to fetch instructions from the DINST register 116 or from the program memory 106. The MUX 134 receives a DSEL signal generated by the IRCM 118. In the depicted example, if the DSEL signal is one, then the CPU 102 fetches the next instruction to be executed from the DINST register 116. If, in contrast, the DSEL signal is zero, then the CPU 102 fetches the next instruction from the program memory 106.

The IRCM 118 receives the enter_dm signal 126 and the exit_dm signal 128 from the CPU 102. The CPU 102 generates the enter_dm signal 126 upon receiving a software breakpoint instruction. The CPU 102 generates the exit_dm signal upon receiving a return from debug mode (i.e., a return instruction). The IRCM 118 can access a debug control register 140 to obtain a monitor mode (MM) bit 136 and an instruction replacement (IRP) bit 138. The MM bit 136 indicates whether the self-hosted debugger 130 or the external debugger 108 is to be used in the debug mode. The MM bit 136 is set to indicate that the self-hosted debugger 130 is used and the MM bit 136 is cleared to indicate that the external debugger 108 is used. The IRP bit 138 is used by the IRCM 118 to determine whether an instruction replacement mechanism is used when the CPU 102 exits debug mode. Though reference is made to bits, other signaling methods are possible including flags, status signals and the like.

Additionally, the OCD system 104 includes a bus interface 142, an instruction complete bit (INC) bit 144, and a debug program counter (DPC) 146. The DPC 146 can be loaded with the program counter value associated with the instruction in the DINST register 116. The bus interface 142 is an interface between the OCD system 104 and the system bus 122. In one implementation, the INC bit 144 is set and reset by the CPU 102 and is accessible by the external debugger 108. When the CPU 102 completes execution of an instruction, then the CPU 102 may set the INC bit 144 to notify the external debugger 108 about the completion of the instruction. In one implementation, the DPC 146 can be accessed by the JTAG interface 120 and by the CPU 102.

The CPU 102 is capable of executing instructions in different modes, such as debug mode and normal mode. The same instruction or instructions, when executed in different modes, may potentially have different effect. In this example, the CPU 102 has a dedicated debug mode with a specific register context. In one implementation of the debug mode, all instructions are allowed, with full privileges.

In this example, the program 112 holds instructions 110. Each instruction 110 is associated with a specific program counter 114. In a debug session, at least one instruction in the program memory 106 may be replaced with at least one software breakpoint 113. This may be done to allow the debugger to evaluate the state of the CPU and system while the execution is halted.

The CPU 102 begins executing the program 112 in the non-debug mode. While the CPU 102 is operating in the non-debug mode, the IRCM 118 sets the DSEL so that the CPU 102 fetches instructions from the program memory 106. As instruction fetch can take several clock cycles, the CPU 102 is stalled until it receives an instruction valid signal from the system bus, indicating that a new instruction is ready.

When the CPU 102 executes the software breakpoint 113, the CPU 102 switches to the debug mode. In the debug mode, the IRCM 118 checks the MM bit 136 in the debug control register 140. If the MM bit 136 is set, then the IRCM 118 is configured to set the DSEL signal so that the CPU 102 fetches instructions directly from the program memory 106, and the CPU 102 continues to execute at a debug handler address. The debug handler address is a specific address reserved by the CPU architecture where self-hosted (monitor) code starts.

When the MM bit 136 is cleared as the CPU 102 enters the debug mode, the MUX 134 provides instructions from DINST register 116. In this example, the DINST register 116 is directly writable by the external debugger 108 via the JTAG interface 120. The external debugger 108 transmits debug instructions to be executed by the CPU 102 by sending the debug instructions to the DINST register 116 when the MM bit 136 is cleared. As an example, the external debugger 108 can issue instructions to observe CPU-specific registers. For example, when the CPU 102 is in the debug mode and the MM bit 136 is cleared, the external debugger 108 may transmit a debug instruction to move data stored in registers, which may not be directly observable by the external debugger 108, in the CPU 102 to other registers that are directly observable by the external debugger 108. When the DINST register 116 is written, the register value is tagged as valid. When the CPU 102 fetches the instruction from the DINST 116, the register value is tagged invalid. The tagging of valid and invalid instructions ensures that the CPU 102 fetches a register value only once. If the CPU 102 were to be instructed to fetch from an invalidated DINST register 116, then the CPU 102 may be stalled until the DINST register 116 is written to by the external debugger 108.

In the processing system 100, the DINST 116 is loaded in parallel from the DR 132. The external debugger 108 can then start the scan operation for a next debug instruction, without waiting for the CPU 102 to complete execution of the currently executing instruction. In this example, the CPU 102 is configured to set the INC bit 144 when the CPU 102 completes execution of a previous instruction. Before a new scanning operation, the external debugger 108 may repeatedly read the INC bit 144. When the INC bit 144 is set, the external debugger 108 can determine that it is safe to scan a further instruction(s) to the DINST register 116. In one example, if the CPU 102 completes execution of the current instruction before the external debugger 108 completes the scanning operation, then the external debugger 108 may start another scanning operation as soon as the last scanning operation is completed. In another example, if the CPU 102 is executing a slow instruction (e.g. a memory operation) and completes execution of the current instruction after the external debugger 108 completes the scanning operation, then the external debugger 108 may scan the next instruction when the CPU 102 completes the previous instruction. This may lead to fewer wait states in the scanning operation of the external debugger.

Still referring to FIG. 1, the CPU 102 asserts the enter_dm signal 126 when it enters the debug mode. At this point, the IRCM 118 switches instruction control to the DINST register 116 if the MM bit 136 is cleared. The CPU 102 then switches the operation from the debug mode to the non-debug mode when the CPU 102 executes the return instruction (e.g., retd instruction). For example, the returned instruction may be issued by the external debugger 108 or by the self-hosted debugger 130. The CPU 102 receives the returned instruction from the program memory 106 if the self-hosted debugger 130 is used. If the external debugger 108 is used, the CPU 102 receives the returned instruction from the DINST register 116.

When executing the returned instruction, the CPU 102 returns to the non-debug mode and assert the exit_dm signal 128. Upon receiving the exit_dm signal 128, the IRCM 118 may return instruction control to the program memory 106 substantially immediately, depending on the IRP bit 138. The IRP bit 138 is written to one by the debugger 108 or 130 to indicate that the instruction replacement mechanism should be used in returning from a software breakpoint. If the IRP bit 138 is set, then the IRCM 118 does not transfer instruction control to the program memory 106 immediately. Instead, one instruction is fetched from DINST register 116 before instruction control is returned to the program memory 106. When the self-hosted debugger is used, the breakpointed instruction may be the only one that the CPU fetches from the DINST register 116, as the IRCM provides that the debug instructions are fetched from the program memory 106. When the external debugger is used, on the other hand, the debug instructions as well as the breakpointed instruction may be fetched from the DINST register 116.

In one implementation, the IRP bit 138 is cleared automatically by the IRCM 118 when the instruction stored in the DINST register 116 is fetched by the CPU 102, and the replacement operation is complete. The IRP bit is usually set by the debug instructions, before returning from the debug mode. In this way, the debugger can select whether to perform a return with or without the instruction replacement mechanism.

If, in contrast, the IRP bit 138 is not set when the CPU exits debug mode, then the IRCM 118 returns instruction control to the program memory 106 and the CPU 102 resumes normal execution from the program counter of the replaced instruction. When the IRCM returns instruction control to the program memory 106, the CPU 102 updates its program counter value with the value stored in the DPC 146.

The debugger 108 or 130 can write the program counter value for the breakpointed instruction to the DPC register 146. The CPU fetches the program counter value in connection with fetching the breakpointed instruction and updates the program counter in the CPU. This provides that the correct program counter value is used when the CPU resumes execution of the remaining program instruction(s) in normal mode.

The external debugger 108 writes to the DINST register 116 after issuing the return instruction. The self-hosted debugger 130, in contrast, may write to the DINST register 116 before executing the return instruction, in order to validate the DINST register 116 and prevent the CPU from stalling because the return instruction is fetched from the program memory 106. In both examples, the replaced instruction fetched from the DINST register 116 will also be executed in the normal mode.

After this the CPU 102 continues by fetching any remaining instructions from the program memory 106. For example, the CPU 102 can know the location of the next instruction by updating the program counter value with the value stored in the DPC 146. Additionally, the CPU 102 can exit the debug mode without any write operation to the program memory 106.

The IRCM is here shown as a separate circuitry component in the on-chip debug system. Other implementations of this component are possible. For example, the IRCM may be placed inside the CPU circuitry.

Figure 2:
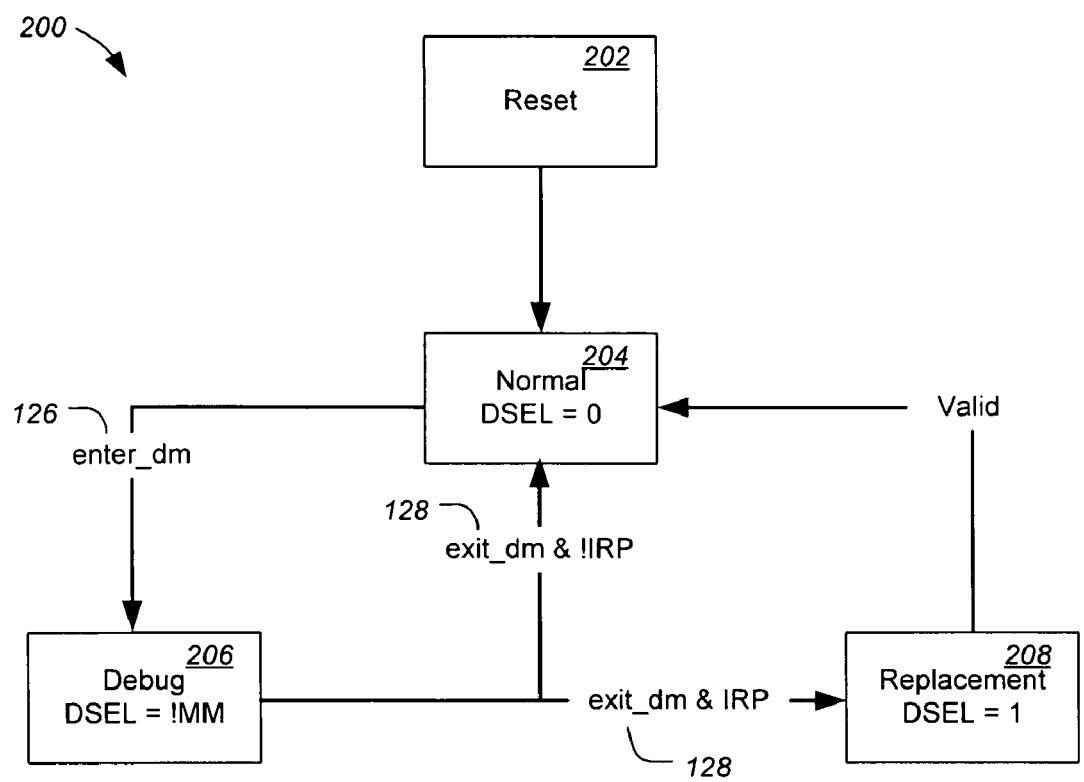
FIG. 2 shows an exemplary state diagram that illustrates operations that can be performed in switching a CPU between a debug mode and a non-debug mode.

FIG. 2 shows an exemplary state diagram 200 that illustrates operations that can be performed in switching a CPU between a debug mode and a non-debug mode. Particularly, it shows how an IRCM (e.g., IRCM 118) can control whether the CPU 102 fetches the next instruction from the program memory 106 or from the DINST register 116. The state diagram 200 includes four states: a reset state 202, a normal state 204, a debug state 206, and a replacement state 208. The IRCM 118 may initially be in the reset state 202. For example, the IRCM 118 may be in the reset state 202 when it is reset or started up. After the reset operation is completed, the IRCM 118 transits into the normal state 204. At this time, the CPU 102 operates in the normal mode and the IRCM 118 sets the DSEL signal to be zero. Thus, in this state the IRCm 118 controls the CPU 102 to fetch instructions from the program memory 106.

During execution, the IRCM 118 transits from the normal state 204 to the debug state 206 when the CPU 102 enters debug mode. The CPU may do this upon executing a software breakpoint. In the debug state 206, the IRCM 118 sets the DSEL signal as the negation of the MM bit 136. When set (cleared), the MM bit 136 indicates that a self-hosted (external) debugger is to be used. For example, if the MM bit 136 is set, then the DSEL signal is cleared, meaning DSEL signal will be a zero. If the MM bit 136 is cleared, then the DSEL signal is set, meaning the DSEL signal will be a one.

At some point in the debug session, the debugger (either the external debugger 108 or the self-hosted debugger 130) may switch the operation of the CPU 102 from debug mode to normal mode. The IRCM 118 will transit from the debug state 206 when the CPU 102 exits the debug mode. The CPU 102, upon receiving a return instruction from the self-hosted debugger 130 or the external debugger 108, asserts the exit_dm signal 128. When the IRCM 118 detects an assertion of the exit_dm signal 128, the IRCM 118 checks whether the IRP bit is set. The IRP bit 138 determines whether instruction replacement will be performed upon exiting debug mode. If the IRP bit 138 is cleared, then the IRCM 118 returns to the normal state 204. In the normal state 204 an instruction replacement is not performed, the IRCM 118 sets the DSEL signal to zero and the CPU 102 fetches subsequent instructions from the program memory 106.

If, in contrast, the IRP bit is set, then the IRCM 118 enters the replacement state 208, where instruction replacement will be performed. In the replacement state 208, the CPU 102 fetches the replaced instruction from the DINST register 116. After the CPU 102 fetches the instruction from the DINST register 116, the IRCM 118 receives a valid signal from the CPU, indicating that the replaced instruction has been executed by the CPU. Then the IRCM 118 transits from the replacement state 208 to the normal state 204 wherein the CPU 102 fetches the next instruction from the program memory 106.

A number of embodiments of the invention have been described. Nevertheless, it will be understood that various modifications may be made without departing from the spirit and scope of the invention. Accordingly, other embodiments are within the scope of the following claims.

What is claimed is:

1. A processing system comprising:
    a processor to switch to a debug mode from a non-debug mode upon executing a software breakpoint;
    a program memory to hold instructions for a program and to receive a software breakpoint that replaces at least one of the instructions;
    an instruction replacement memory separate from the program memory to receive the replaced instruction from any of the processor and an external debugger; and
    a control component to selectively cause the processor to fetch a next instruction for execution from the instruction replacement memory.

2. The processing system of claim 1, where the instruction replacement memory is a register.

3. The processing system of claim 1, where a self-hosted debugger is used in the debug mode, the self-hosted. debugger being operated by the processor executing self-hosted debug instructions.

4. The processing system of claim 3, where the control component causes the processor to fetch the next instruction from the program memory at least in the debug mode.

5. The processing system of claim 4, where the self-hosted debugger causes the processor to place the replaced instruction in the instruction replacement register before the self-hosted debugger instructs the processor to return from the debug mode to the non-debug mode.

6. The processing system of claim 1, where the external debugger places at least one debug instruction in the instruction replacement register.

7. The processing system of claim 6, where the processor fetches the debug instruction from the program memory.

8. The processing system of claim 7, where the external debugger places an instruction in the instruction replacement register for the processor to return from the debug mode to the non-debug mode, and thereafter places the replaced instruction in the instruction replacement register.

9. The processing system of claim 1, where the processor fetches the replaced instruction from the instruction replacement register.

10. The processing system of claim 9, where the processor thereafter fetches at least one remaining instruction of the program from the program memory.

11. The processing system of claim 1, where the control component receives a monitor mode signal that indicates whether a self-hosted debugger or the external debugger is to be used in the debug mode.

12. The processing system of claim 1, further comprising a debug program counter register to hold at least one program counter value to be used in executing the replaced instruction.

13. The processing system of claim 12, where the debug program counter register receives the program counter value from any of the processor and the external debugger.

14. A method to be performed in connection with debugging code executable on a processor, the method comprising:
   switching a processor to a debug mode from a non-debug mode upon the processor executing a software breakpoint that replaces an instruction of a program in a program memory;
   fetching a debug instruction from the program memory for execution in the debug mode;
   switching the processor to the non-debug mode upon receiving a return instruction; and
   fetching the replaced instruction, upon reinitiating execution of the program in the non-debug mode, from an instruction replacement memory separate from the program memory.

15. The method of claim 14, where the debug instruction is fetched from the program memory upon determining a status of a mode signal.

16. The method of claim 14, where the replaced instruction is fetched upon determining a status of an instruction replacement signal.

17. The method of claim 14, further comprising fetching a program counter value from a debug program counter register for use in executing the replaced instruction.

18. The method of claim 14, further comprising executing the replaced instruction in the non-debug mode.

19. The method of claim 18, further comprising thereafter fetching at least one remaining instruction of the program from the program memory.

20. A computer program product tangibly embodied in a computer-readable medium, the computer program product including instructions that, when executed, cause a processor to perform operations comprising:
   switching to a debug mode from a non-debug mode upon executing a software breakpoint that replaces an instruction of a program in a program memory;
   fetching a debug instruction from the program memory for execution in the debug mode;
   switching to the non-debug mode upon receiving a return instruction; and
   fetching the replaced instruction, upon reinitiating execution of the program in the non-debug mode, from an instruction replacement memory separate from the program memory.

21. The computer program product of claim 20, wherein the operations further comprise thereafter fetching at least one remaining instruction of the program from the program memory.

* * * * *

UNITED STATES PATENT AND TRADEMARK OFFICE
CERTIFICATE OF CORRECTION

PATENT NO. : 7,506,205 B2  Page 1 of 1
APPLICATION NO. : 11/354340
DATED : March 17, 2009
INVENTOR(S) : Frode Milch Pedersen It is certified that error appears in the above-identified patent and that said Letters Patent is hereby corrected as shown below:

Title Page, References Cited, Other Publications, J-Link ARM RDI Flash Breakpoints reference, please delete "http://www/segger.com/jlink_arm_rdi_flashbp.html>" and insert --http://www.segger.com/jlink_arm_rdi_flashbp.html>-- therefor;

Title Page (Page 2), References Cited, Other Publications, 'Connecting to a target board with the AVR JTAGICE mkll' [online] reference, please delete "http://www/atmel.com/dyn/ resources/prod_documents/doc2562.pdf>" and insert --http://www.atmel.com/dyn/resources/prod_documents/doc2562.pdf>-- therefor;

Column 4, line 20, please delete "130," and insert --130.-- therefor;

Column 7, line 48, please delete "IRCm" and insert --IRCM-- therefor;

Column 8, line 43 (Claim 3), please delete "self-hosted." and insert --self-hosted-- therefor.

Signed and Sealed this

Twenty-eighth Day of July, 2009

JOHN DOLL
*Acting Director of the United States Patent and Trademark Office*